US010845549B2

(12) United States Patent
Mach et al.

(10) Patent No.: US 10,845,549 B2
(45) Date of Patent: Nov. 24, 2020

(54) MULTIPLEX OPTICAL FIBER CONNECTOR

(71) Applicant: Canon USA Inc., Melville, NY (US)

(72) Inventors: Anderson Thi Mach, Cambridge, MA (US); Tzu-Yu Wu, Malden, MA (US); Alexander Altshuler, Cambridge, MA (US)

(73) Assignee: Canon U.S.A., Inc., Melville, NY (US)

(*) Notice: Subject to any disclaimer, the term of this patent is extended or adjusted under 35 U.S.C. 154(b) by 0 days.

(21) Appl. No.: 16/269,122

(22) Filed: Feb. 6, 2019

(65) Prior Publication Data
US 2019/0243074 A1 Aug. 8, 2019

Related U.S. Application Data

(60) Provisional application No. 62/628,129, filed on Feb. 8, 2018.

(51) Int. Cl.
| G02B 6/38 | (2006.01) |
| G02B 6/04 | (2006.01) |
| G02B 6/36 | (2006.01) |
| G02B 6/35 | (2006.01) |
| H01R 13/625 | (2006.01) |
| F21V 8/00 | (2006.01) |

(52) U.S. Cl.
CPC ............ *G02B 6/3871* (2013.01); *G02B 6/04* (2013.01); *G02B 6/353* (2013.01); *G02B 6/3833* (2013.01); *G02B 6/3878* (2013.01); *G02B 6/3897* (2013.01); *G02B 6/0006* (2013.01); *G02B 6/0008* (2013.01); *G02B 6/3604* (2013.01); *H01R 13/625* (2013.01)

(58) Field of Classification Search
CPC ................................ G02B 6/3871; G02B 6/04
See application file for complete search history.

(56) References Cited

U.S. PATENT DOCUMENTS

| 4,124,272 | A | * | 11/1978 | Henderson | ........... | G02B 6/3604 |
| | | | | | | 385/26 |
| 4,641,915 | A | * | 2/1987 | Asakawa | ............. | G02B 6/3886 |
| | | | | | | 385/26 |
| 6,895,137 | B2 | * | 5/2005 | Zuluaga | ............... | A61B 5/0062 |
| | | | | | | 385/15 |
| 7,325,979 | B2 | | 2/2008 | Ammer et al. | | |
| 7,427,165 | B2 | | 9/2008 | Benaron et al. | | |
| 8,409,082 | B2 | * | 4/2013 | Irion | .................. | A61B 1/00117 |
| | | | | | | 362/572 |
| 8,660,389 | B2 | | 2/2014 | Jono et al. | | |

(Continued)

OTHER PUBLICATIONS

David C. Klorig, et al., A Magnetic Rotary Optical Fiber Connector for Optogenetic Experiments in Freely Moving Animals, Journal of Neuroscience Methods, 2014, pp. 1-23, vol. 227, 132-9,https://www.ncbi.nlm.nih.gov/pmc/articles/PMC4122252/.

(Continued)

*Primary Examiner* — Sung H Pak
(74) *Attorney, Agent, or Firm* — Canon U.S.A., Inc. IP Division

(57) ABSTRACT

An apparatus, method, and system for connecting optical fibers, commonly used in medical instruments, for use in endoscopy, non-evasive treatments of disease, as well as other medical factions incorporating optical fibers, wherein the novel connector allows for rotation of at least one optical fiber within the connector.

20 Claims, 8 Drawing Sheets

(56) References Cited

U.S. PATENT DOCUMENTS

| | | |
|---|---|---|
| 9,158,076 B2 | 10/2015 | Guo et al. |
| 9,409,356 B2 | 8/2016 | Karb et al. |
| 2004/0234206 A1* | 11/2004 | Hamm ................. A61B 5/6852 385/53 |
| 2004/0264299 A1 | 12/2004 | Cooke et al. |
| 2005/0043606 A1 | 2/2005 | Pewzner et al. |
| 2007/0003207 A1 | 1/2007 | Dunphy et al. |
| 2007/0274646 A1 | 11/2007 | Shapson et al. |
| 2012/0213472 A1* | 8/2012 | Violante .............. G02B 6/3604 385/26 |
| 2012/0230636 A1 | 9/2012 | Blockley et al. |
| 2016/0041344 A1 | 2/2016 | Wasserbauer |
| 2016/0062041 A1 | 3/2016 | Lee et al. |

OTHER PUBLICATIONS

Masasru Kobayashi, et al., SF Connector Optical Interface for Parallel Optical Module, web, 2007, 4 pages, NTT Technology Licensing Site, Proceedings of the Nagoya IEICE General Conference, The Institute of Electronics, Information and Communication Engineers(IEICE), http://www.ntt.co.jp/ntt-tec/e/high-tec/ct2-c002.html.

* cited by examiner

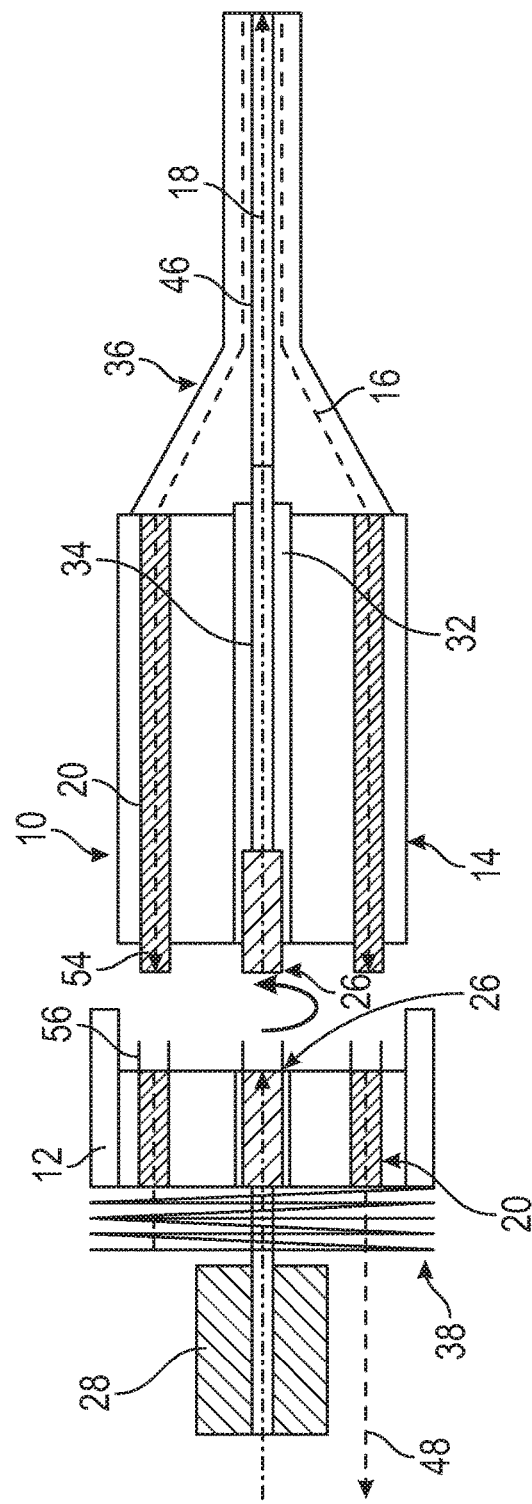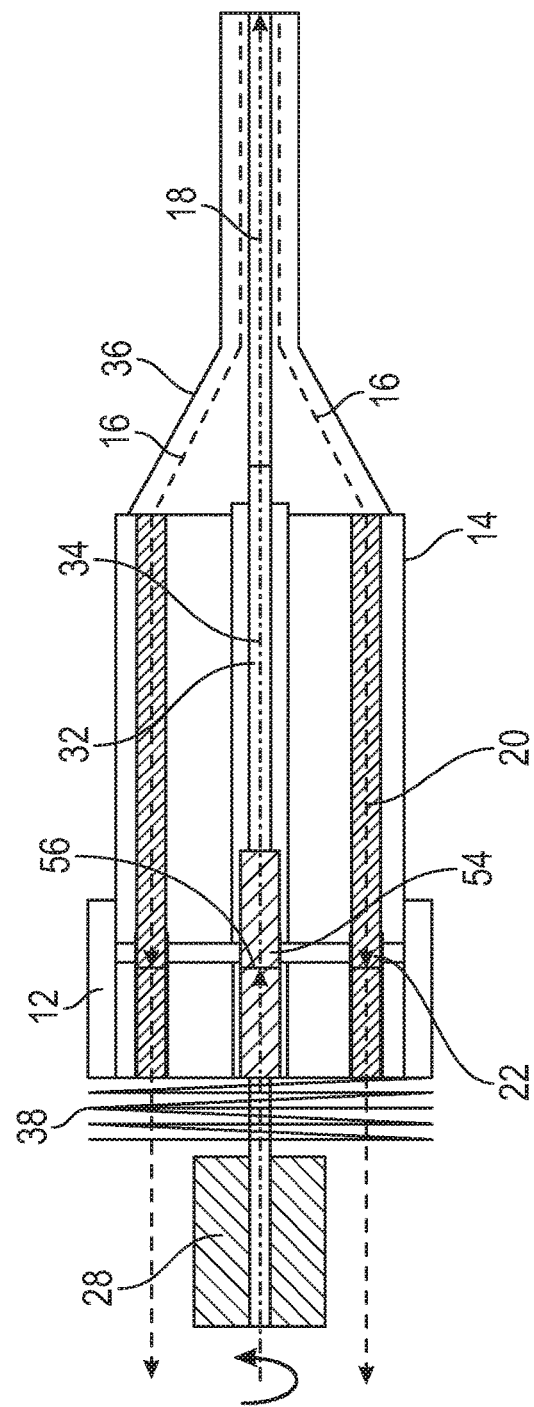
FIG. 3A
FIG. 3B

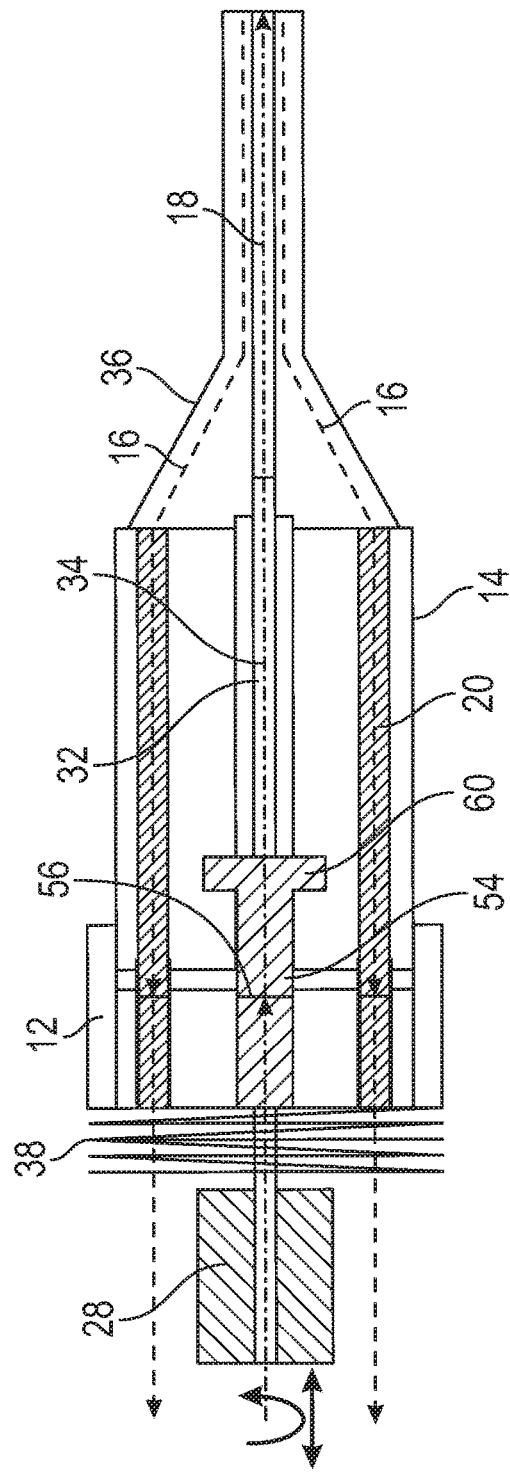
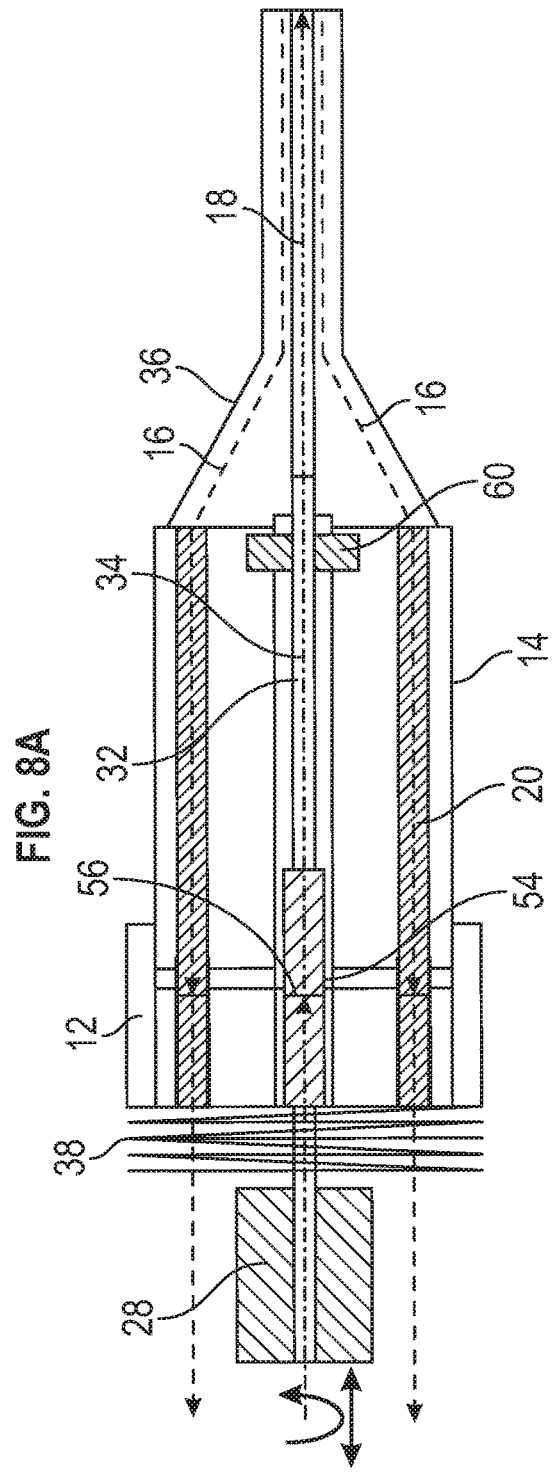

MULTIPLEX OPTICAL FIBER CONNECTOR

CROSS REFERENCE TO RELATED PATENT APPLICATIONS

This application claims priority from U.S. Provisional Patent Application No. 62/628,129 filed on Feb. 8, 2018, in the United States Patent and Trademark Office, the disclosure of which is incorporated herein in its entirety by reference.

FIELD OF THE DISCLOSURE

The present disclosure relates generally to apparatus and methods for connecting optical fibers, commonly used in medical instruments, for use in endoscopy, non-evasive treatments of disease, as well as other medical factions incorporating optical fibers.

BACKGROUND OF THE DISCLOSURE

Medical instruments incorporating optical fibers, like spectrally encoded endoscope (SEE), consists of at least two optical fibers, namely an illumination fiber and a detection fiber. In various medical instruments the Illumination aspect may require rotating or oscillating the output light from a fiber to scan a region of interest to visualize. Detection comprises of one or more fibers that collect the reflected light back to be processed by a spectrometer or other instrument used to display an image on a screen. Depending on the design, the detection fibers can rotate with the illumination fiber or be stationary surrounding a rotating core.

In the case of stationary detection fibers, the detection and illumination fibers are independent of one another, and each fiber is assembled into an individual optical connector. In various instrument designs where multiple fibers are needed, the number of connections between fibers increases the complexity of use (connecting/disconnecting each connector), assembly time (connectorizing each fiber), number of parts, cost, and increases the chance of severing or damaging the fiber.

In addition, as connector quality has a significant effect on the amount of light and information being transmitted through the connectors, credence must be given to the mechanical quality of the connector, as well as longevity of the connector. As the connectors mechanically couple and align the cores of fibers so light can pass, inferior connectors lose more light due to reflection or misalignment of the fibers. Standard optical fiber connectors are fixed contacts where the ferrules and alignment sleeves of the fibers are stationary.

In a SEE application, for example, a motor with optical rotary junction rotates the illumination fiber in oscillation or continuous 360 degree rotation sweeping light along the sample. One or more detection fibers collect the reflected light to be processed by a spectrometer. Stationary detection fibers are fixed within or fixed surrounding a hollow sheath that the illumination fiber is free to rotate in.

Existing multiplex connectors which house multiple fibers do not allow for rotation within the connector housing, amounting in current SEE scopes being assembled with individual connectors for each optical fiber. The individual connectors result in each connector being connectorized one at a time, greatly adding to assembly time, number of components, risk for damage, and cost.

SUMMARY

Accordingly, it would be particularly beneficial to disclose an optical fiber connector capable of housing multiple optical fibers, and allowing for rotation of one or more fibers while retaining other fibers in a static position.

Thus, to address such exemplary needs, the presently disclosed apparatus and methods for connecting optical fibers, commonly used in medical instruments, is provided.

The present disclosure teaches various apparatus for repeatedly connecting optical fibers together, wherein the apparatus includes a male plug housing at least two fibers and a female plug housing at least two fibers which correspond with the two fibers in the male plug, and a mechanism for securing the fibers of the male plug with the fibers of the female plug, wherein at least one of the at least two fibers is configured to rotate or translate axially within the apparatus.

In various embodiments, the mechanism for securing the fibers from the male plug to the female plug may include a ferrule connector, an alignment sleeve, a plug connector, derivatives thereof, or combination therefrom. The male and female connectors may contain many ferrule contacts. One or multiple fibers may be bundled into a single ferrule In addition, other embodiments of the present disclosure incorporates a motor in communication with the at least one fiber configured to rotate or translate axially within the apparatus.

In yet additional embodiment, the apparatus may further comprise an alignment mechanism for aligning the female plug with the male plug, such that the opposing fibers found in the female plug and male plug correspond with one another, and communicate efficiently.

In yet another embodiment of the subject disclosure, the apparatus further comprising a scope to be used in conjunction with the apparatus for engaging and disengaging the scope. Various examples of scopes may include a SEE scope, endoscope, and other minimally evasive medical devices.

In some embodiments, the apparatus further comprises a console to be used in conjunction with the apparatus and for engaging and disengaging the console. The console may include a spectrometer, a motor; a junction box, computer, and a light source in communication with an at least one of the at least two fibers.

In various embodiments, the SEE scope may be able to connect directly to the motor/RJ of the console. In other embodiments, the scope may also be able to connect to a hand piece with a motor in it. The motor in the hand piece runs synchronously with the motor/RJ in the console.

In additional embodiments of the subject disclosure, the at least one fiber configured to rotate or translate axially within the apparatus may be an illumination fiber, a detection fiber, derivatives thereof, or combination therefrom.

In various other embodiments, the apparatus may further comprise a sacrificial connector, situated between the male plug and female plug, configured for occasional replacement.

In yet additional embodiments, the at least one fiber configured to rotate or translate axially within the apparatus is in communication with an illumination fiber.

In further embodiments, the apparatus further comprises a locking mechanism for connecting the fibers, wherein the locking mechanism may include a cam lock, a bayonet, a twist lock, a push lock, derivatives thereof, or combination therefrom.

In addition, embodiments of the apparatus may further include a detection mechanism for detecting if the connection between the male plug and female plug is proper, as well as detecting and signaling if the connection is faulty or improper.

In yet additional embodiments of the subject apparatus, the connector may further comprise a spring configured to maintain connection of the at least two fibers while in use. The spring may be configured in the male plug or female plug, as well as being configured in both plugs by using multiple springs with different or the same spring constants.

In various embodiments, the male plug may disposable and configured for single use. Independently, the female plug may be configured to be disposable and configured for single use.

Another embodiment the subject disclosure features a safety mechanism configured on the male plug and/or female plug, wherein the safety mechanism aims to protect the fiber of the connector while disconnected. Various examples of a safety mechanism may include a safety cap, a shutter, a membrane, derivatives thereof, or combination therefrom.

These and other objects, features, and advantages of the present disclosure will become apparent upon reading the following detailed description of exemplary embodiments of the present disclosure, when taken in conjunction with the appended drawings, and provided paragraphs.

BRIEF DESCRIPTION OF THE DRAWINGS

Further objects, features and advantages of the present disclosure will become apparent from the following detailed description when taken in conjunction with the accompanying figures showing illustrative embodiments of the present disclosure.

FIG. 3a provides a side perspective diagram of a plugged exemplary connector, according to one or more embodiments of the present subject matter.

FIG. 3b illustrates a side perspective diagram of an unplugged exemplary connector, according to one or more embodiments of the present subject matter.

FIG. 8a provides a side schematic diagram of an exemplary connector, according to one or more embodiments of the present subject matter.

FIG. 8b provides a side schematic diagram of an exemplary connector, according to one or more embodiments of the present subject matter.

Figure 1:
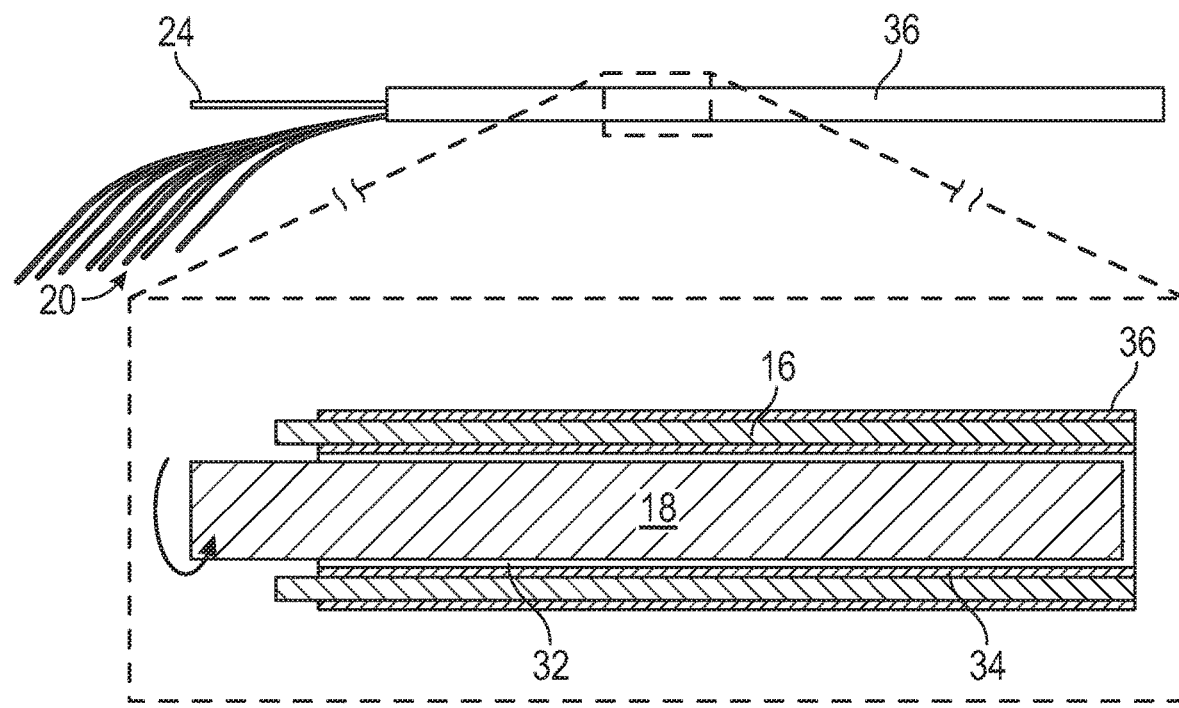
FIG. 1 illustrates a side perspective diagram of an exemplary connector depicted in a SEE probe, according to one or more embodiments of the present subject matter.

Throughout the Figures, the same reference numerals and characters, unless otherwise stated, are used to denote like features, elements, components or portions of the illustrated embodiments. In addition, reference numeral(s) including by the designation "'" (e.g. 12' or 24') signify prior art elements and/or references. Moreover, while the subject invention will now be described in detail with reference to the Figures, it is done so in connection with the illustrative embodiments. It is intended that changes and modifications can be made to the described embodiments without departing from the true scope and spirit of the subject disclosure as defined by the appended paragraphs.

DETAILED DESCRIPTION OF THE DISCLOSURE

Figures 2A, 2B:
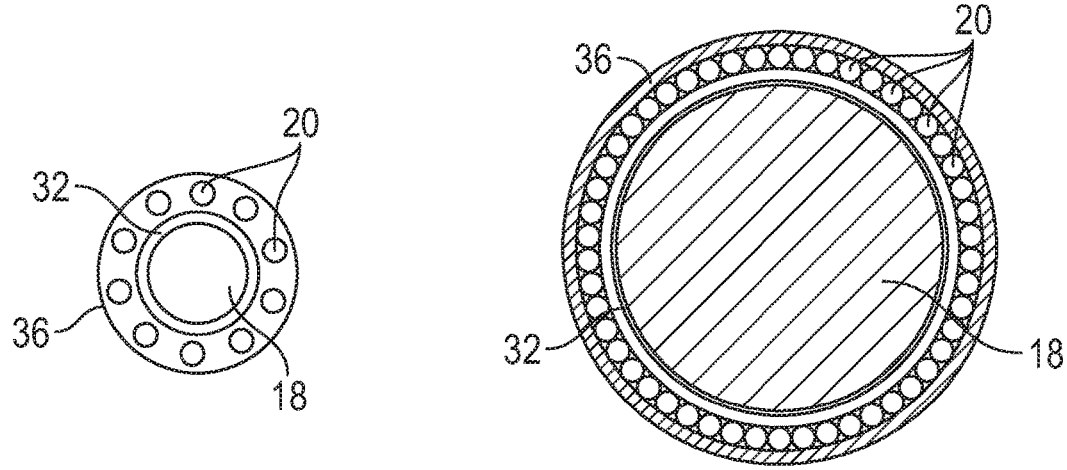
FIGS. 2a and 2b illustrates a front perspective diagrams of exemplary connectors depicted in a SEE probe, according to one or more embodiments of the present subject matter.

FIGS. 1 and 2 illustrate side and front perspective diagram of an exemplary SEE scope 52. Wherein the connector 10 is comprised of a female plug 12 and male plug 14 (see FIGS. 3a and 3b), designed to connect with each other. Each of the female plug 12 and male plug 14 integrates a number of detection fibers 16 and illumination fibers 18 that align with corresponding fibers and can easily be connected and disconnected. A single connection of the connector 10 establishes optical and mechanical contacts of all the detection fibers 16 and illumination fibers 18 to transmit light.

As seen in FIGS. 3a and 3b, the connector 10 incorporates static and dynamic elements, wherein static elements are fixed and do not move in the connector 12. The static elements may include illumination fibers 16 and/or detection fibers 14, and static contacts 22 for bridging at least one fiber, 16 or 18, from the female plug 12 to the male plug 14. Dynamic elements 24 are designed to move in at least one axes, and may include at least one detection fiber 14 and/or illumination fiber 16. Dynamic contacts 26 bridge the fiber 16 and/or 18, from the female plug 12 to the male plug 14. The dynamic element further comprises a drive cable 46 in communication with a motor 28, which is designed to drive the dynamic fiber(s) 16 and/or 18 via the drive cable 46. In the present embodiment, the detection fibers 14 and illumination fibers 16, and accompanying components, may be static, dynamic, or both depending on requirement and design.

FIGS. 3a and 3b provide side perspective diagrams of a plugged (3a) and unplugged (3b) embodiment of the subject exemplary connector 10. In both images, the detection fibers 16 are the static contacts 22 of the connector 10 and do not move, wherein the illumination fiber 18 is dynamic and bridged by the dynamic contact 26, allowing for free rotation/oscillation. The connector 10 joins the detection fibers 16 of the SEE scope 52 to a spectrometer 30 (not shown), and the illumination fiber 18 of the SEE scope 52 to the motor 28.

The connector 10 incorporates a hollow center 32 for housing the dynamic elements 24, wherein the inner surface of the hollow center 32 and/or dynamic element 24 may benefit from a low friction material inner sheath 34. The dynamic elements 24 are free to rotate and advance/retract within the hollow center 32 of the connector 10. In addition the connector 10 may also comprise an outer sheath 36 covering the connector 10 for reduced exposure to outer elements as well as reduced friction when the probe is in use.

Furthermore, a spring 38 may be incorporated upon the female plug 12 to apply pressure and improve connectivity of the female plug 12 to the male plug 14. The spring 38 in the connector 10 ensures the optical ferrules 54 of the SEE scope 52 and console 40 maintain constant contact while in connection. The spring 38 can be situated in either or both the male plug 14 and female plug 12; however, since the scope is high volume, the spring 38 is currently shown in the female plug 12 to reduce component volume and assembly complexity within the SEE scope 52. A large spring 38 can keep force on the overall connector 10, or multiple individual springs 38 can be built into the connector 10 for each ferrule 54. The spring force can be applied to only the dynamic components, only the stationary component, or to both stationary and dynamic with the same or different amount of spring preload force. Since it is often unavoidable to have vibration while at least some components rotate inside the connector assembly, it is essential to have preload spring force applied to the interface to ensure the surface connects.

Figure 4A:
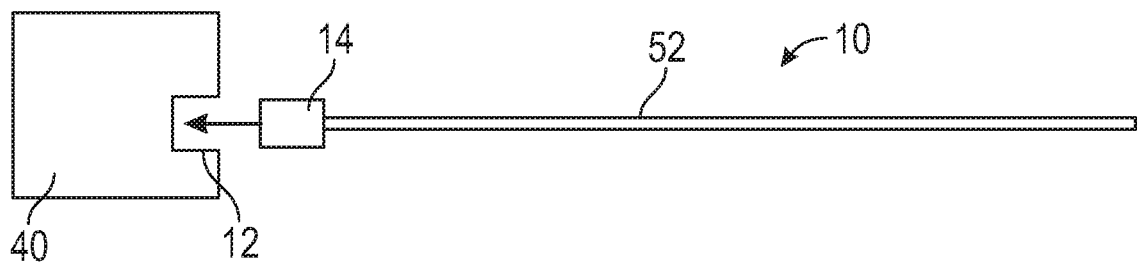
FIG. 4a through 4c depict various side schematic diagram of exemplary connectors, according to one or more embodiments of the present subject matter.

FIG. 4a depicts a side schematic diagram of an exemplary connector 10 being incorporated at a console 40. The console 40 includes the light source 42 for illumination, a motor 28, a rotary junction 44 to operate the drive cable 46, a spectrometer 30 for detection, and a computer 50 for data processing. The female plug 12 of the connector 10 is situated in or about the console 40, and the male plug 14 of the connector 10 is situated at the non-probing end of the SEE scope 52. The static contacts 22 link the non-moving detection fibers 16 of the SEE scope 52 to the spectrometer 30 in the console 40. The dynamic contacts 26 link the rotating/translating drive cable 46 to the illumination fiber 18 of the SEE scope 52, to the motor 28, and light transmitting rotary junction 44 found in the console 40.

Figure 4B:
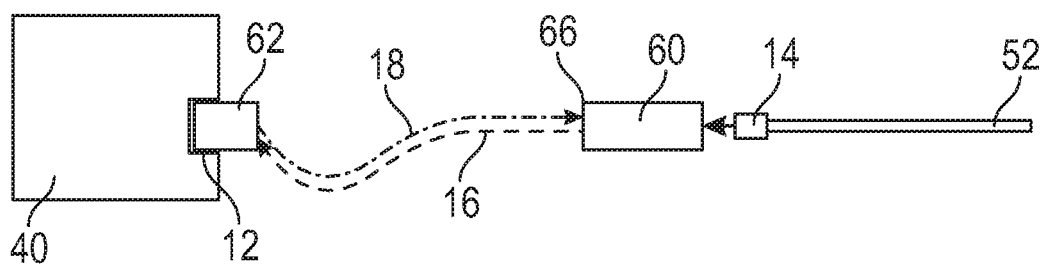
Figure 4C:
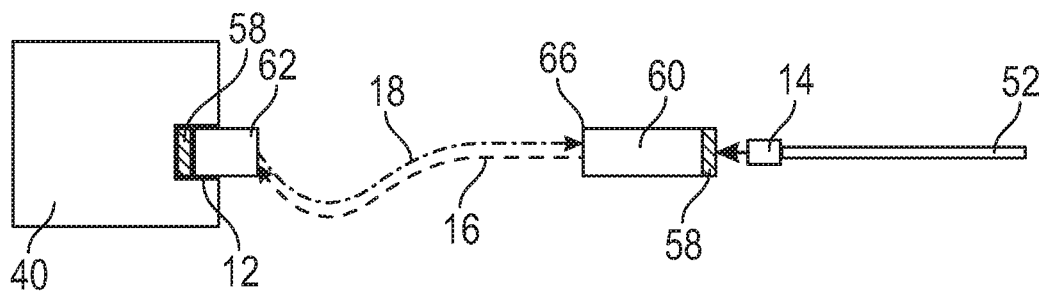

In addition, and as depicted in FIGS. 4b and 4c, the connector 10 may also plug into a hand piece 60 with secondary motor 66. The hand piece may 60 be connected to the console 40 with a cable 62, and the cable 62 is connected to the primary motor/RJ 28 in the console 40 as well as the spectrometer 30. As seen in FIG. 4c, one or more sacrificial connector(s) 58 may be incorporated at a point between the console 40 and cable 62, and/or the secondary motor 66 and plug 14. The cable 62 is configured to allow for flexible communication of the illumination fiber 18 and detection fiber 16.

In this embodiment, connection of the SEE scope 52 to the console 40 involves two simultaneous mechanical connections, which include a connection of the static elements 20 to the console 40, and a simultaneous connection of the dynamic elements 24 of the SEE scope 52 to the console 40. This connection locks the SEE scope 52 to the console 40 by locking mechanism such as push/pull, twist/bayonet, or cam lock, and establishes the optical static contact 22 of the static elements 20 of the SEE scope 52 to the console 40. The connection of the dynamic elements 24, connects and disconnects, simultaneously, with the connection of the static elements 20. In various embodiments, elements may be incorporated to recognize when full connection of the dynamic 26 and static contacts 22 of the SEE scope 52 to the console 40 is accomplished. The system will not operate, or issue a notice, if there is an issue with the connection, including partial or misconnection.

Figure 5:
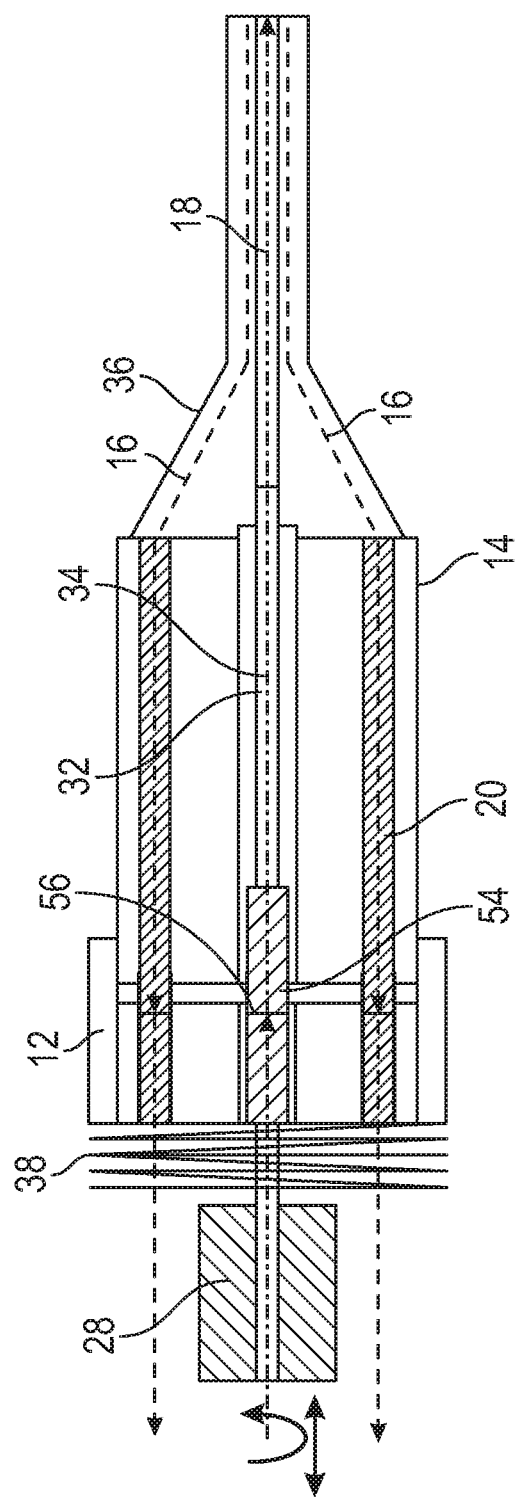
FIG. 5 illustrates a side perspective view of an exemplary connector, according to one or more embodiments of the present subject matter.

FIG. 5 illustrates a side perspective view of an exemplary connector 10, according to one or more embodiments of the present subject matter. FIG. 5 provides a more detailed view of the connector 10 depicted herein. The detection fibers 16 and illumination fibers 18 may be optically aligned via ferrules 54, alignment sleeves 56, and/or standard or custom optical connectors (not shown). These ferrules 54, sleeves 56 and/or other connectors may be assembled within the connector 10. In one embodiment depicted in FIG. 5, detection fibers 16 are bonded into the ferrules 54 and the alignment sleeves 56 of the connector 10 keep the fiber 16 and ferrules 54 optical aligned upon connection. The dynamic contact is assembled into connector 10 which optically and mechanically connects and locks to the rotary junction 44 of the console 40 to the SEE probe 52. The dynamic contacts 26 of the connector 10 on the console 40, controlled by the motor 28, is configured such that the rotating fiber stops at a certain orientation and/or a home/zero position when disengaging. The dynamic contacts 26 of the SEE scope 52, is also pre-aligned in a certain orientation to match the console 40 connector orientation to ensure accurate alignment during engagement and disengagement of the connector 10.

FIG. 5 further incorporates the connection of the SEE scope 52 to console 40 which allows the motor 28 to: rotate the dynamic fiber a full 360°, oscillate the dynamic fiber, or translate axially (forward/backward) the drive cable 46 operating the fiber within the hollow center 32. The dynamic illumination fiber 18 and hollow center 32 are aligned axially centric to the rotational axes of the motor 28. The dynamic fiber 18 rotates symmetrically with respect to the axes.

Figure 6A:
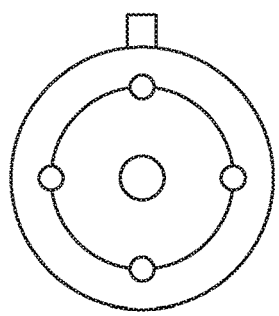
FIGS. 6a through 6g illustrate various connector ferrule patterns which may be used in an exemplary connector, according to one or more embodiments of the present subject matter.
Figure 6B:
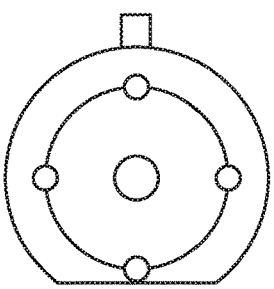
Figure 6C:
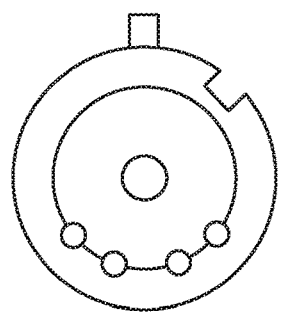
Figure 6D:
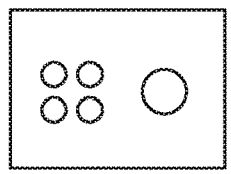
Figure 6E:
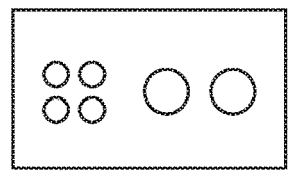
Figure 6F:
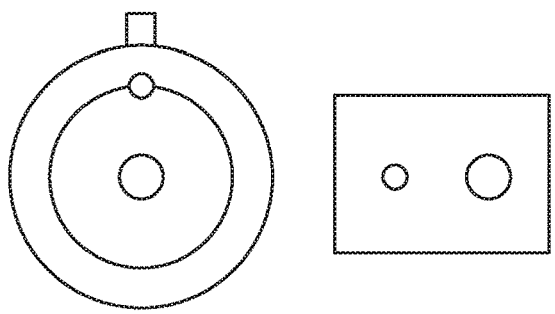
Figure 6G:
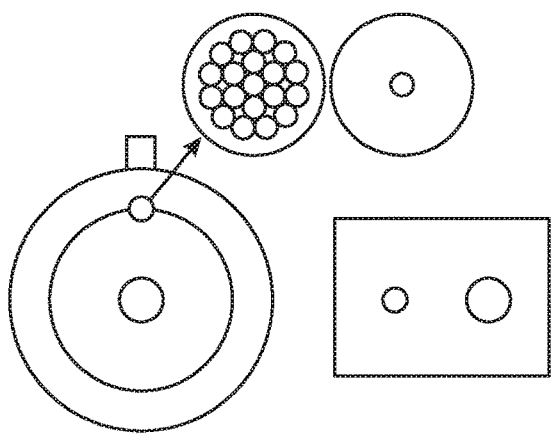

FIGS. 6a through 6g illustrate various connector ferrule 54 patterns which may be used in an exemplary connector 10, according to one or more embodiments of the present subject matter. The male plug 14 of the SEE scope 52 is designed to plug at a specific unique orientation to the female plug 12 of the console 40 to prevent misconnections. The connectors may be keyed by: incorporating ridges and slots to the male plug 14 and female plug 12 to create a unique oriented connection, as seen in FIGS. 6a-6c; or by designing a shape which allow only one orientation for engaging the male plug 14 with the female plug 12; or by incorporating ferrules 54 and alignment sleeves 56 which are in a unique patterned position (FIGS. 6d-6e). In addition FIG. 6f depicts a ferrule pattern of one detection fiber and one illumination fiber, whereas FIG. 6g depicts a ferule contact holding a bundle of packed fibers. In various embodiments, along with the rotational and fixed optical contacts in the connection, fixed electrical contacts can also be built into the male and female connectors. The electrical contacts provide power and data transfer between components in the handle and cart such as motor, encoder, sensors, buttons, etc.

Various safety mechanisms may be built into the connector 10 to prevent the optical contacts from getting dirty from dust, dirt, particles, or physical contact. A sliding safety cap or retractable shutters on the SEE scope 52 connector and the console 40 connector prevent the transmission of light to the outer environment while the SEE scope 52 is not engaged with the console 40. The cap or shutter may mechanically retract upon disconnection.

The female plug 12 of the connector 10 on the console 40 is non-disposable and designed with materials to endure wear from multiple connections and disconnections. The connector 10 must be designed with materials to endure high wear and cleaning/sterilization. Fittingly, the connector 10 can be designed for disposability and non-disposability, as desired. Multi-use, non-disposable SEE scope 52 connectors 10 are designed with materials to endure high wear and cleaning/sterilization. Single use, disposable scope connectors 10 have design measures in place to prevent secondary use after disconnection, including a severable light output fiber after disconnection, as well as a safety cap or shutter which permanently blocks the connection or light transfer after disconnection.

Figure 7:
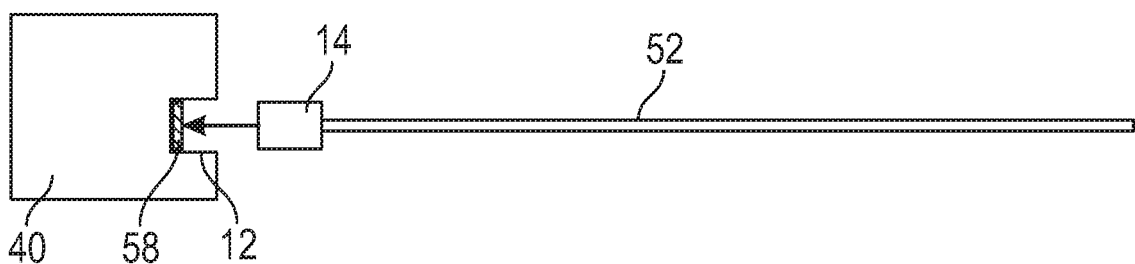
FIG. 7 illustrates a side perspective view of an exemplary connector, according to one or more embodiments of the present subject matter.

FIG. 7 illustrates a side perspective view of an exemplary connector 10, according to one or more embodiments of the present subject matter. As the female plug 12 of the connector 10 on the console 40 is non-disposable and designed with materials to endure wear from multiple connections and disconnections, a sacrificial connector 58 may be used. The sacrificial connector 58 containing the dynamic elements 24 and static elements 20 can be replaced after a certain number of uses to reduce wear directly to the motor 28, rotary junction 44 and the spectrometer 30.

In assembling the connectors 10, static contact 22 can be connectorized and polished at the same time via fixturing, wherein static ferrules 54 are assembled into the connector 10, and fibers (16 and 18) are inserted into ferrules 54 that will keep the fiber within alignment. The connector 10 maintains the ferrules 54 and fibers (16 and 18) in position, and acts as a polishing fixture sub-component where the ferrules 54 are optically polished to the same plane.

The dynamic contact 26 is assembled with the drive cable 46, and the dynamic contact 24 is connectorized in the hollow center 32 of the connector 10, and then assembled to SEE scope 52. Dynamic fiber contacts can be off the shelf connector (LC; F3000, Dialink, etc.) or a custom connector with ferrule 54 and alignment sleeves 56. In other embodiments, multiple fibers may be bundled into a single ferrule.

FIGS. 8a and 8b provide side schematic diagrams of exemplary connectors 10, according to one or more embodiments of the present subject matter. As shown in FIGS. 8a and 8b, the drive cable 46 may be kept in position while rotating in the hollow center 32 of the connector 10 by a mechanical stop 60 that allows for rotation and prevents the drive cable 46 from moving axially. This feature further increases accuracy and reduces wear and tear on the dynamic elements 24 of the connector 10.

Figure 9:
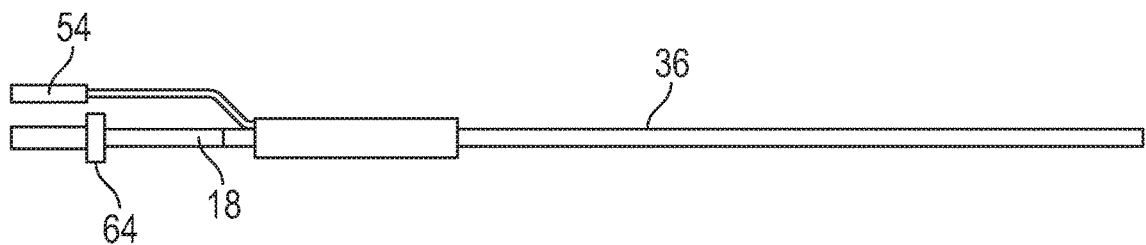
FIG. 9 illustrates a top view of an SEE probe employing an exemplary connector, according to one or more embodiments of the present subject matter.
Figure 10:
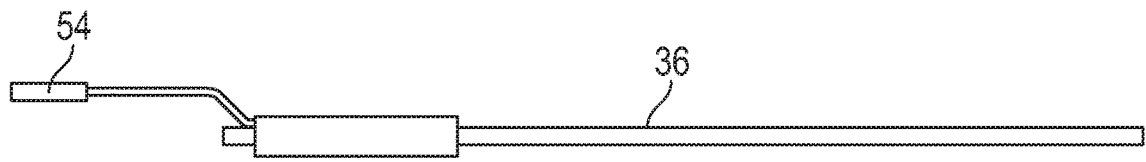
FIG. 10 is a top view of detection elements employed in the exemplary SEE probe of FIG. 9, according to one or more embodiments of the present subject matter.
Figure 11:
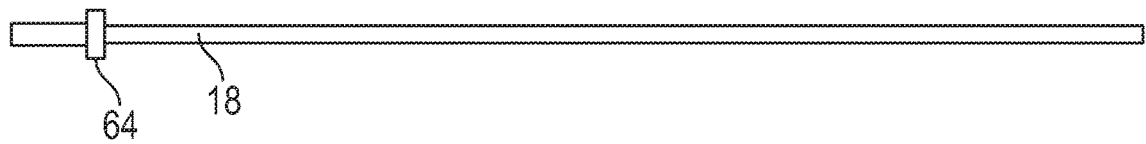
FIG. 11 is a top view of illumination elements employed in the exemplary SEE probe of FIG. 9, according to one or more embodiments of the present subject matter.

FIGS. 9, 10 and 11 illustrates a top view of an SEE probe employing an exemplary connector, with FIG. 9 showing an assembled combination of the detection elements shown in FIG. 10, and the illumination elements shown in FIG. 11.

FIG. 9 depicts the connector 10 with the detection fibers 16 and outer sheath 36. In addition, the ferrule 54 is depicted with the connector 10 positioned inbetween. FIG. 11 shows us the illumination fibers 18 that are assembled into the hollow center 32, which is lined with the inner sheath 34. A single connection of the connector 10 establishes optical and mechanical contacts of all the detection fibers 16 and illumination fibers 18 to transmit light. The illumination fiber 18 further comprises a mechanical stop 64 on the rotating illumination fiber 18, wherein the mechanical stop 64 may also be a ball bearing that allows for the fiber 18 to be fixed in place from moving along the z-axis but free to rotate by the ball bearing. The illumination fiber 18 may be assembled within the mechanical stop 64, and the mechanical stop 64 is fixed within the connector 10 by clamping, set screw, epoxy, or the like.

Figure 12A:
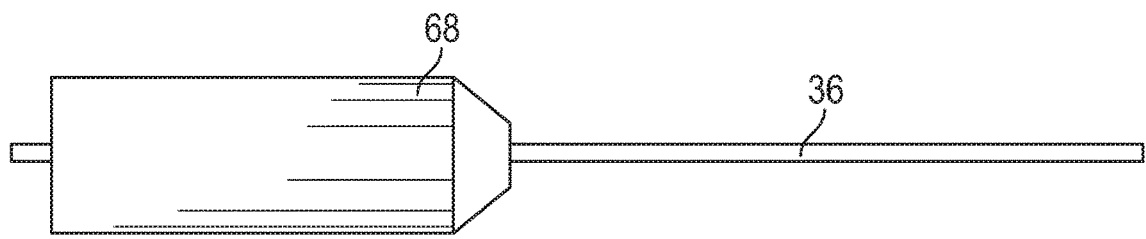
FIG. 12a provides a side perspective view of an exemplary connector, according to one or more embodiments of the present subject matter.
Figure 12B:
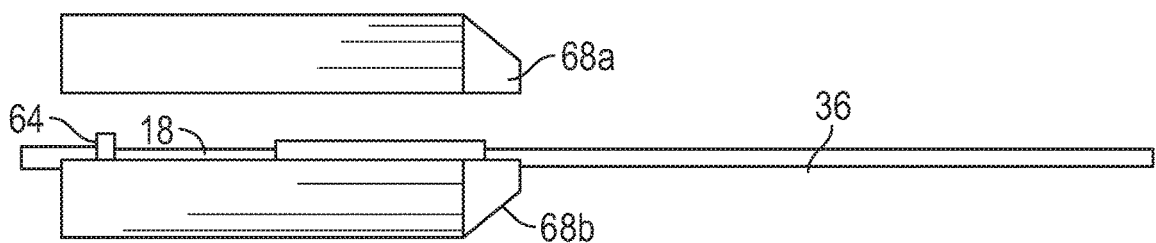
FIG. 12b provides a side perspective view of a partially disassembled exemplary connector, according to one or more embodiments of the present subject matter.

As seen in FIGS. 12a and 12b, the connector 10 may have an outer covering or body 68, comprised of two pieces 68a and 68b, which may be assembled together to provide protection. In one embodiment, the two half s 68a and 68b may liken a clam shell that allow the inner components of the connector 10 to be assembled into the first half 68a, then the second half 68b is placed atop the first half 68a. The two halves 68a and 68b can be clamped together by screws, mechanical snap fit, adhesives, or other fastening elements.

In various other embodiments, the outer body 68 can be comprised of multiple parts that are assembled into a single component outer body, encompassing the inner components of the connector 10. The outer body 68 may be configured to retain the inner components of the device, including the detection sheath, illumination core, optical ferrules/contacts, electronics, electrical contacts, as well as other components.

The invention claimed is:

1. An apparatus for connecting optical fibers comprising:
a male plug housing at least two fibers,
a female plug housing at least two fibers and configured to mate with the male plug, and
a mechanism for connecting the fibers of the male plug with the fibers of the female plug,
wherein at least one of the at least two fibers of the male plug, and at least one of the at least two fibers of the female plug, are both configured to rotate or axially translate within the apparatus, and
wherein at least one of the at least two fibers of the male plug and at least one of the at least two fibers of the female plug are stationary, when the at least one of the at least two fibers of the male plug and at least one of the at least two fibers of the female plug both rotate or axially translate within the apparatus.

2. The apparatus according to claim 1, wherein the mechanism for connecting the fibers is selected from the group comprising of a ferrule connector, alignment sleeve, plug connector, derivatives thereof, and combination therefrom.

3. The apparatus according to claim 1, further comprising a motor in communication with the at least one fiber, wherein the motor is configured to rotate or axially translate the at least one fiber.

4. The apparatus according to claim 1, further comprising an alignment mechanism for aligning the female plug with the male plug.

5. The apparatus according to claim 1, further comprising a scope to be used in conjunction with the apparatus, wherein the apparatus is configured for engaging and disengaging the scope.

6. The apparatus according to claim 1, further comprising a console to be used in conjunction with the apparatus, wherein the apparatus is for engaging and disengaging the console.

7. The apparatus according to claim 6, wherein the console comprises:
a spectrometer;
a motor;
and a light source in communication with an at least one of the at least two fibers.

8. The apparatus according to claim 1, wherein the at least one fiber configured to rotate or axially translate within the apparatus is selected from the group comprising an illumination fiber, a detection fiber, derivatives thereof, and combination therefrom.

9. The apparatus according to claim 1, wherein the at least one fiber configured to rotate or axially translate within the apparatus is in communication with an illumination fiber.

10. The apparatus according to claim 1, further comprising a locking mechanism for connecting the male plug housing and female plug housing, wherein the locking mechanism is selected from the group comprising a cam lock, a bayonet, twist lock, push lock, derivatives thereof, and combination therefrom.

11. The apparatus according to claim 1, further comprising a detection mechanism for detecting if the connection between the male plug housing and female plug housing is proper.

12. The apparatus according to claim 1, further comprising a spring configured to maintain connection of the at least two fibers while in use.

13. The apparatus according to claim 1, wherein the male plug housing is disposable and configured for single use.

14. The apparatus according to claim 1, wherein the female plug housing is disposable and configured for single use.

15. The apparatus according to claim 1, further comprising a safety mechanism for protecting the at least two fiber of the connector when not connected.

16. The apparatus according to claim 15, wherein the safety mechanism is selected from the group comprising a safety cap, a shutter, derivatives thereof, and combination therefrom.

17. An apparatus for connecting optical fibers comprising:
a male plug housing at least two fibers,
a female plug housing at least two fibers and configured to mate with the male plug, and
a mechanism for connecting the fibers of the male plug with the fibers of the female plug,
wherein once the female plug is mated with the male plug, at least one of the at least two fibers is configured to rotate or axially translate both within the female plug and male plug, while at least one of the at least two fibers is stationary both within the female plug and male plug.

18. The apparatus according to claim 17, wherein the mechanism for connecting the fibers is selected from the group comprising of a ferrule connector, alignment sleeve, plug connector, derivatives thereof, and combination therefrom.

19. The apparatus according to claim 17, further comprising a motor in communication with the at least one fiber, wherein the motor is configured to rotate or axially translate the at least one fiber.

20. The apparatus according to claim 17, further comprising an alignment mechanism for aligning the female plug with the male plug.

* * * * *